(12) United States Patent
Heber

(10) Patent No.: US 7,270,231 B2
(45) Date of Patent: Sep. 18, 2007

(54) SELF-STACKING SPIRAL CONVEYOR BELT

(76) Inventor: Gerald J. Heber, 16108 SE. 24th St., Bellevue, WA (US) 98008

( * ) Notice: Subject to any disclaimer, the term of this patent is extended or adjusted under 35 U.S.C. 154(b) by 117 days.

(21) Appl. No.: 11/138,123

(22) Filed: May 26, 2005

(65) Prior Publication Data

US 2006/0266623 A1    Nov. 30, 2006

(51) Int. Cl.
*B65G 21/18* (2006.01)
(52) U.S. Cl. .................................. 198/778; 198/848
(58) Field of Classification Search ................ 198/778, 198/848
See application file for complete search history.

(56) References Cited

U.S. PATENT DOCUMENTS

| | | | |
|---|---|---|---|
| 3,938,651 A * | 2/1976 | Alfred et al. ............... | 198/778 |
| 4,603,776 A * | 8/1986 | Olsson ....................... | 198/728 |
| 4,941,567 A * | 7/1990 | Olsson ....................... | 198/778 |
| 4,955,465 A | 9/1990 | Straight et al. ............. | 198/778 |
| 5,183,149 A * | 2/1993 | Wierman et al. ........... | 198/778 |
| 5,190,143 A * | 3/1993 | Froderberg et al. ......... | 198/778 |
| 5,350,056 A | 9/1994 | Hager ......................... | 198/778 |
| 5,460,260 A | 10/1995 | Ochs et al. ................. | 198/778 |
| 5,803,232 A * | 9/1998 | Froderberg ................. | 198/778 |
| 6,029,797 A * | 2/2000 | Olsson ....................... | 198/778 |
| 6,237,750 B1 * | 5/2001 | Damkjaer et al. ........... | 198/778 |
| 6,695,128 B2 | 2/2004 | Palmaer et al. ............. | 198/778 |
| 6,796,420 B2 * | 9/2004 | Byrne et al. ................ | 198/822 |

FOREIGN PATENT DOCUMENTS

WO    WO 2004/005167    1/2004

* cited by examiner

*Primary Examiner*—Mark A Deuble
(74) *Attorney, Agent, or Firm*—Dean A. Craine

(57) ABSTRACT

An improved self-stacking spiral conveyor belt that includes a plurality of interconnected links each including two side plates connected together with two transverse rods. A flexible support structure is disposed around the rods which connect the links together. Each side plate includes a laterally extending foot with an abutment edge formed or attached thereto a design to limit lateral movement of the upper link over a lower link when the belt is aligned in a helical configuration. The abutment edge is formed by at least one downward extending step structure. The step structure is offset with the vertical surface of the side plate thereby forming a rest surface that the upper edge of the lower link supports. Formed on the side plates is a guide tab that includes a beveled inner surface that prevents the upper edge of the lower side plates from moving inward and prevents or limits stretching along the direction of the belt. In one embodiment, the edge arc on the elongated slots are reduced and approximately equal to the diameter of the transverse rod thereby increasing the contact area between transverse rod and the elongated slot.

10 Claims, 6 Drawing Sheets

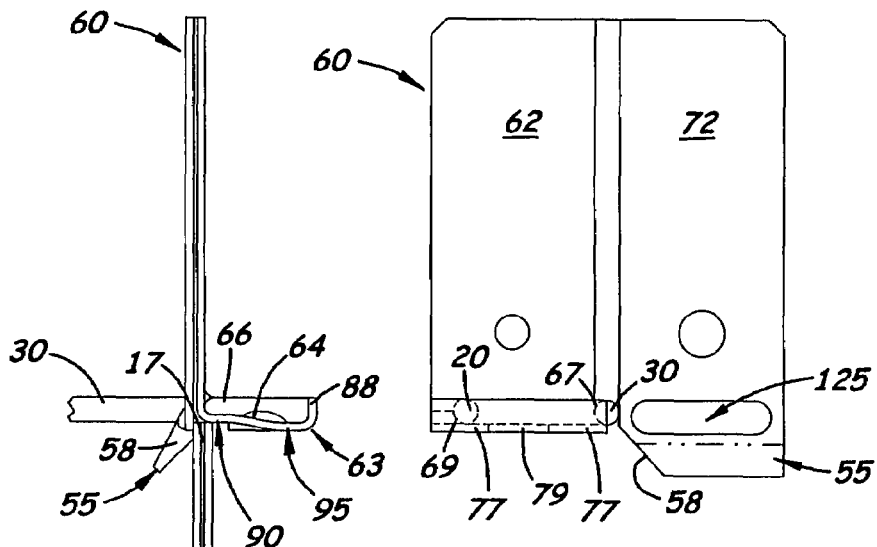
Fig. 8
Fig. 9
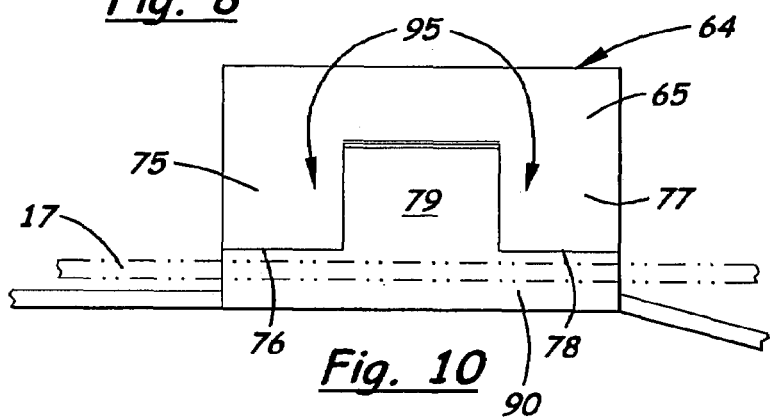
Fig. 10
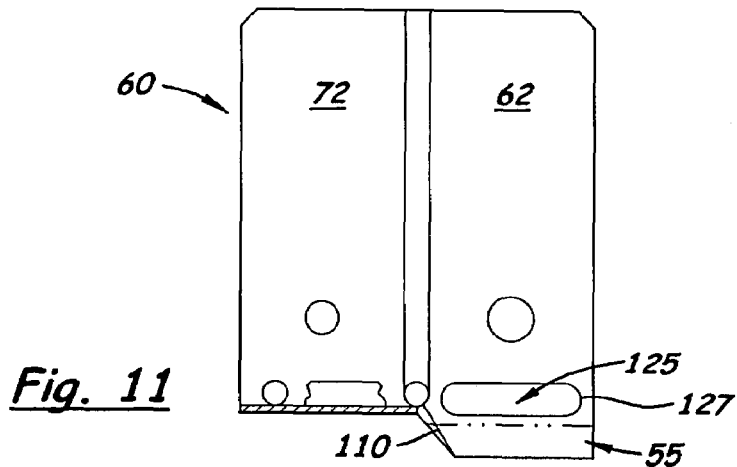
Fig. 11

SELF-STACKING SPIRAL CONVEYOR BELT

BACKGROUND OF THE INVENTION

1. Field of the Invention

The invention disclosed herein pertains to self-stacking spiral conveyor belts commonly used for freezing or cooking foods and other processing applications, and more precisely to improvements that make such belts more reliable.

2. Description of the Related Art

Endless, self-stacking conveyor belts used in the freezing and cooking food industries are described in U.S. Pat. Nos. 4,603,776; 4,941,567; 5,190,143; 5,803,232 and 6,796,420. Such conveyor belts comprise a plurality of interconnected links, each including two parallel transverse rods and a pair of upward extending side plates.

Each side plate includes an integrally formed outer one-half plate section and an inner one-half plate section. The outer one-half plate section is slightly offset outwardly with respect to the inner one-half plate section thereby enabling the inner one-half plate section on a link to extend over the inside surface of the outer one-half plate section on the adjacent link. During operation, the outer one-half plate section on a link and the inner one-half plate section on a adjacent link overlap and slide together as the belt moves along its path.

The belt travels in a straight path until it enters a spiral or helical configuration. When aligned in the helical configuration, the lower tier of the belt is supported by the drive system while the upper tiers are supported by the lower tiers. The interface between adjacent tiers is designed to keep the belt supported and laterally aligned. During use, the upper edge of the lower link contacts the bottom surface of the transverse rods on the upper tier. The tiers are laterally aligned by resting the upper edge of the lower link against the transverse rods on the upper link and by a guide tab that extends from the inner one-half plate section on the upper link.

The ends of the two transverse rods extend through elongated slots formed on the inner one-half plate sections of the left and right side plates to loosely connect the two links. Because conveyor belts are designed to be placed in a helical configuration, the slots are elongated on the side plate to which the belt turns to enable the belt to contract on that side. In the prior art, the diameter of the arc and the width of each elongated slot are slightly larger than the diameter of the transverse rod so that the transverse rod may slide freely inside the elongated slot during operation. While such movement is desirable for maximum flexibility in the belt, if the diameter of the transverse rod and the diameter and width of the elongated slot are substantially different, the amount of contact area between the transverse rod and the elongated slot is reduced, which increases the pressure exerted in specific locations on the belt which results in failure.

When moving in a helical configuration, longitudinally aligned tensile forces are applied to the belt causing it to stretch in the direction of travel. Also, when the belt travels in the helical path, the belt is stacked into circular tiers that bend the links and create stress on other components. When the belt is stacked in tiers, the contact surfaces or points between the upper and lower links in the stacked tiers are gradually worn which leads to breakage and a reduction of the overall height of the belt.

Because self-stacking conveyor belts are commonly used for freezing or cooking foods, the flow of cold or hot air through the belt and around the food products placed on the belt is an important consideration. Unfortunately, with conveyor belts found in the prior art, the flow of air is less than desirable.

SUMMARY OF THE INVENTION

It is an object of the present invention to provide an improved self-stacking spiral conveyor belt that has higher lateral stability over conveyor belts found in the prior art.

It is another object of the present invention to provide such a conveyor belt that has a lower rate of wear between adjacent tiers when stacked in a helical configuration than conveyor belts found in the prior art.

It is another object of the present invention to provide such a conveyor belt specifically designed to reduce wear on the transverse rods and the elongated slots.

It is another object of the present invention to provide such a conveyor belt specifically designed to reduce the amount of radial stress exerted on the links located in the lower tiers when in a helical configuration.

It is a further object of the present invention to provide such a conveyor belt also specifically designed to improve airflow through the mesh and around the product to be frozen, cooked or processed.

It is another object of this invention to make these improvements without increasing manufacturing costs of the belt These and other objects are met by the improved self-stacking spiral conveyor belt disclosed herein that uses a plurality of transversely aligned interconnected links. Each link includes two vertically aligned side plates each comprising an outer one-half plate section and an inner one-half plate section. Two transverse rods extend between the two outer one-half plate sections on the two side plates. A flexible mesh structure or other product support structure made of a plurality of small loop structures or plastic castings that individually go around adjacent transverse rods is disposed between the two side plates and used to support products to be frozen, cooked or processed.

On each side plate, the outer one-half side plate section is an L-shaped structure when viewed in cross-section that includes an upward extending sidewall and a perpendicularly aligned, laterally extending foot. During assembly, the outer ends of the transverse rods extend through openings or slots formed on the lower edge of the each sidewall. The ends of the two transverse rods terminate on the top surfaces of the two feet. The two rods are welded to the top surface of the feet to strength and provide additional support. To reduce wear on the transverse rods when placed in a stacked configuration, in one embodiment, the bottom surfaces of the transverse rods are co-planar with the bottom surfaces of the feet. In another embodiment, the transverse rods are elevated slightly above the bottom surfaces of the feet.

Formed on the bottom surface of each foot is at least one downward extending step structure. The step structure creates a transversely aligned abutment edge on the bottom surface of the foot and divides the bottom surface of the foot into a resting surface for the upper edge of a lower link when the belt is in a helical configuration and a driving surface for moving the belt. Because the outside surface of the side plate on the lower link rests against the abutment edge on the upper link, lateral movement of the link tier is reduced In the preferred embodiment, the step structure is integrally formed on the bottom surface thereby reducing manufacturing costs. It should be understood that the term 'integrally formed' means a step structure created on the foot by a molding, casting or stamping manufacturing process.

As mentioned above, the bottom surfaces of the transverse rods are located above or co-planar with the bottom surface of each foot. When the belt is stacked in tiers, the upper edge of a side plate located on a lower link rests solely against the resting surface or rests on both the resting surface and the two transverse rods. Because, the weight of the portion of the belt above the link is no longer exerted exclusively on the transverse rods, wear on the transverse rods is reduced.

Formed on the inner one-half plate section is an inward directed diagonal guide tab. The guide tab limits inward lateral movement of the upper link over the lower link when the belt is in a stacked configuration. A diagonally aligned beveled, v-shaped surface is welded to or formed from the inside edge of the guide tab. The upper edge of the v-shaped surface is welded to the adjacent transverse rod that prevents the upper edge of the lower side plates or the drive system from bending the guide tab and limits stretching on the one-half plate section along the direction of the belt.

As discussed above, elongated slots are formed on the inner one-half plate sections of the two side plates on each link. In the preferred embodiment, the elongated slots are sufficiently long enough to enable the belt to turn in a clockwise or counter-clockwise direction. As an optional feature, the arc on the elongated slot adjacent to the edge may be reduced to a size approximately equal to the diameter of the transverse rod to increase the contact area between the transverse rod and the elongated lot. The width of the elongated slot remains large to maintain safe low resistance sliding of the rod in the slot. By increasing the contact areas between the rod and the arc of the slot, forces are exerted over larger surfaces which reduces wear.

In addition to the above conveyor belt, a method of manufacturing the conveyor belt having an abutment edge formed on at least one foot is also disclosed.

DESCRIPTION OF THE DRAWINGS

FIG. 8 is a front elevational view of a side plate shown in FIG. 7.

FIG. 9 is a side elevational view of the side plate shown in FIGS. 7 and 8.

FIG. 10 is a bottom plan view of the side plate shown in FIGS. 7-9 with the slots formed therein to enable the transverse rods to be co-planar with the bottom surface of the foot.

FIG. 11 is a side elevational view of another embodiment of the side plate showing the transverse rods disposed over the top surface of the foot.

DESCRIPTION OF THE PREFERRED EMBODIMENT(S)

Figure 1:
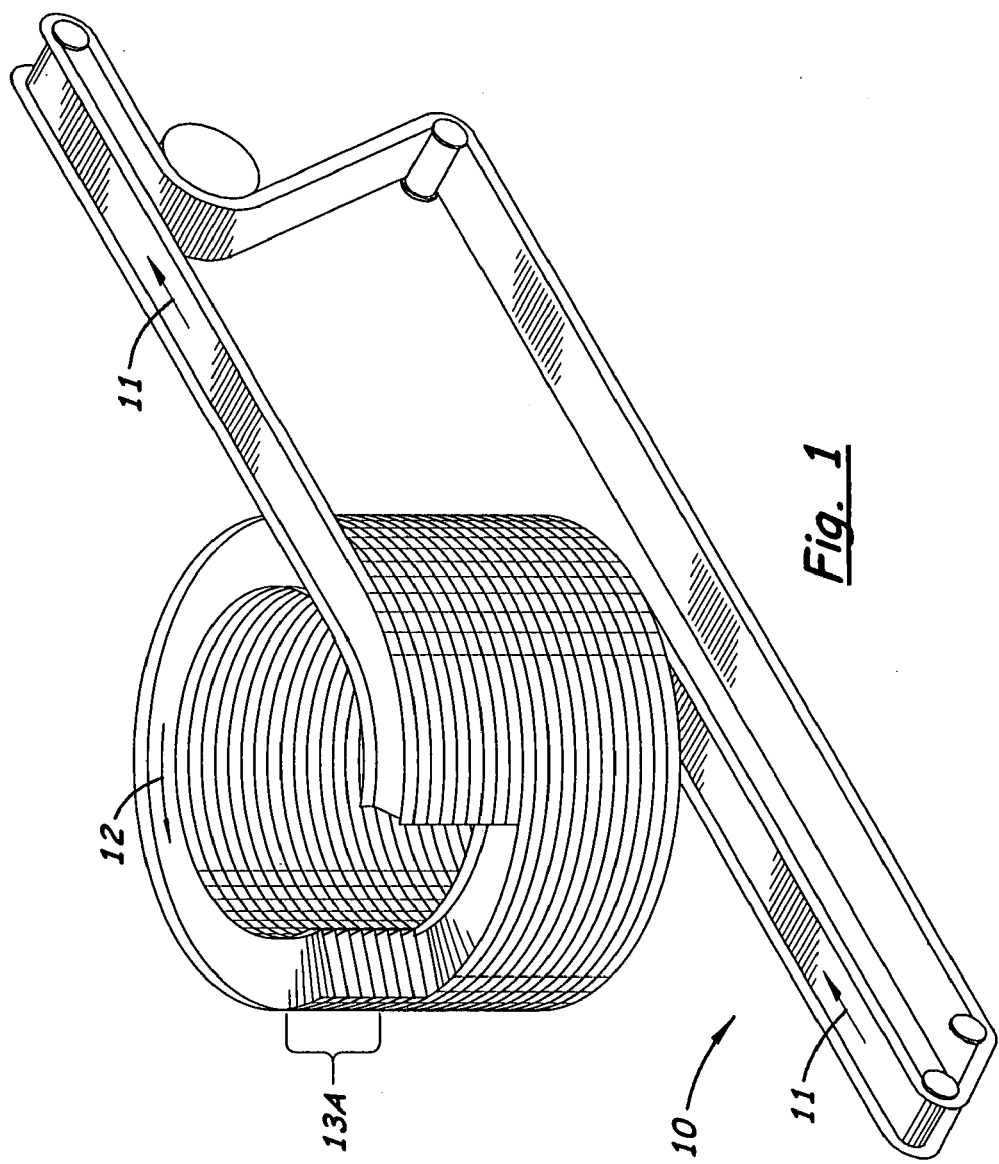
FIG. 1 is a perspective view of an endless, self-stacking conveyor belt system used in the prior art.
Figure 2:
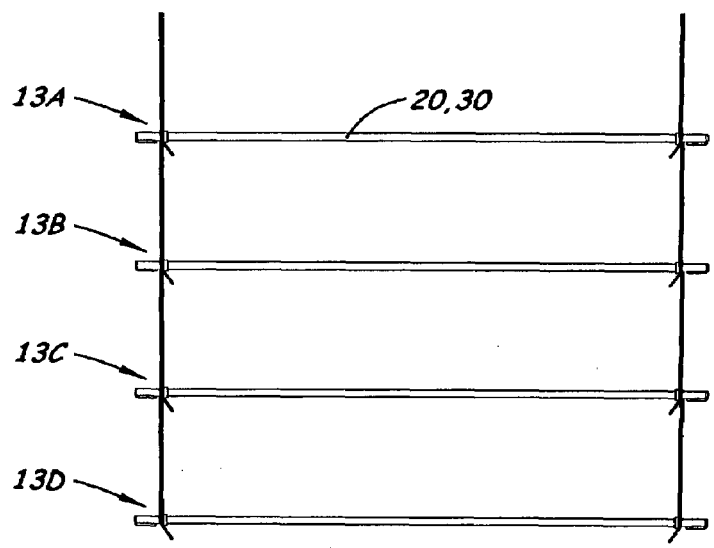
FIG. 2 is a cross sectional view of the conveyor belt aligned in a helical configuration.

Shown in FIGS. 1 and 2, is a self-stacking, endless the conveyor belt 10 used to transport various products. The conveyor belt 10 is similar to the conveyor belts disclosed in U.S. Pat. Nos. 4,603,776; 4,941,567; 5,190,143; 5,803,232 and 6,796,420. Such belts 10 travel in straight and helical paths 11, 12, respectively. When traveling a helical path 12, the belt 10 is self-stacking with the upper tiers resting on top of lower tiers, denoted 13A-13D.

Figure 3:
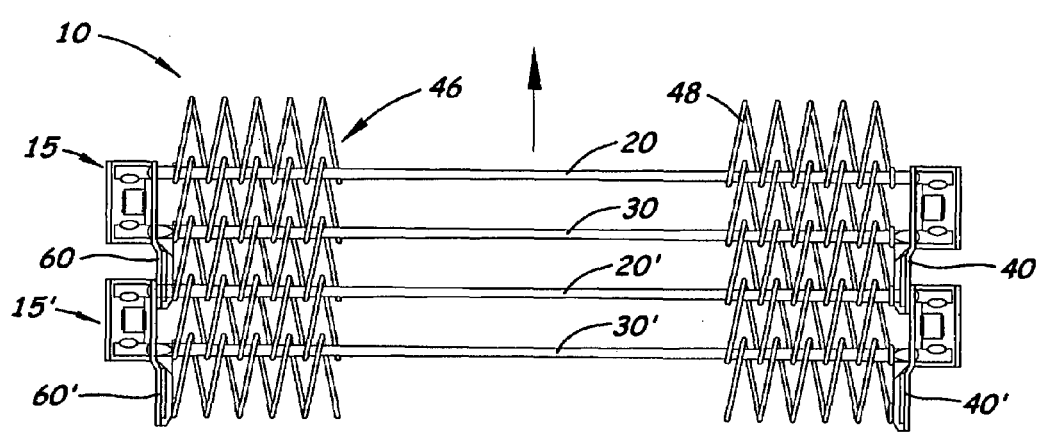
FIG. 3 is a top plan view of a section of the conveyor belt showing two links connected together.
Figure 4:
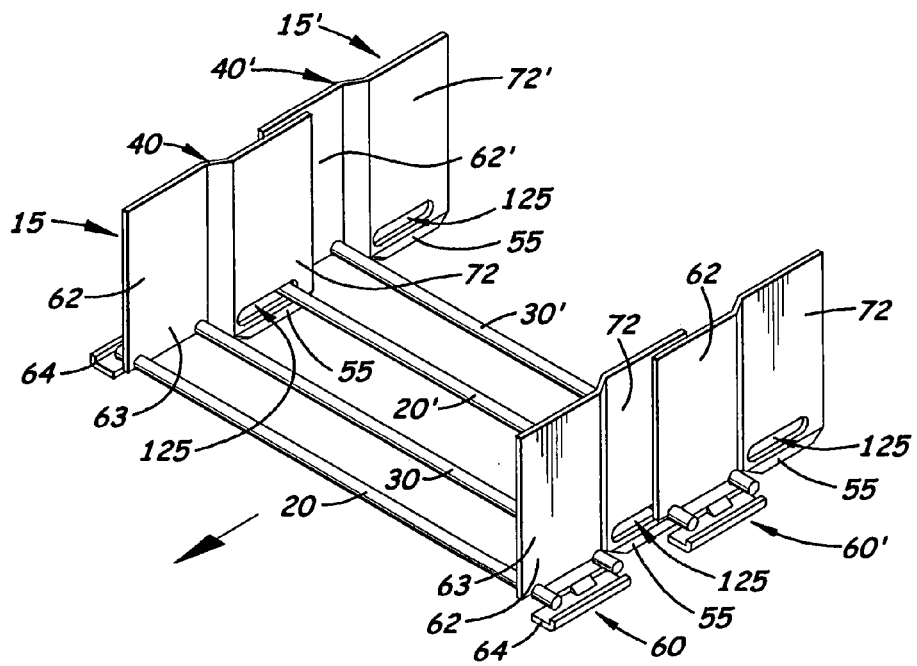
FIG. 4 is a top perspective view of a section of two links connected together.

As shown in FIGS. 3 and 4, the conveyor belt 10 includes a plurality of transversely aligned interconnected links 15, 15'. Each link 15, 15' includes two transverse rods 20, 30, 20', 30' and two vertically aligned, opposite side plates 40, 60 and 40', 60', respectively. A flexible support structure 46 (shown only in FIG. 3) made of a plurality of small plastic or metal structures 48 that individually wrap around adjacent transverse rods 20, 30. and 20', 30' are disposed between the side plates 40, 60, and 40', 60' and used to support products on the conveyor belt 10. The two side plates 40, 60 on each link 15 are substantially identical and mirror copies of each other. Each side plate 40, 60 include an outer one-half plate section 62 and an offset inner one-half plate section 72. The outer one-half plate section 62 includes a vertical sidewall 63 and a perpendicularly aligned, laterally extending foot 64. The inner one-half plate section 72 includes a horizontally aligned elongated slot 125 and a downward extending guide tab 55.

Figure 6:
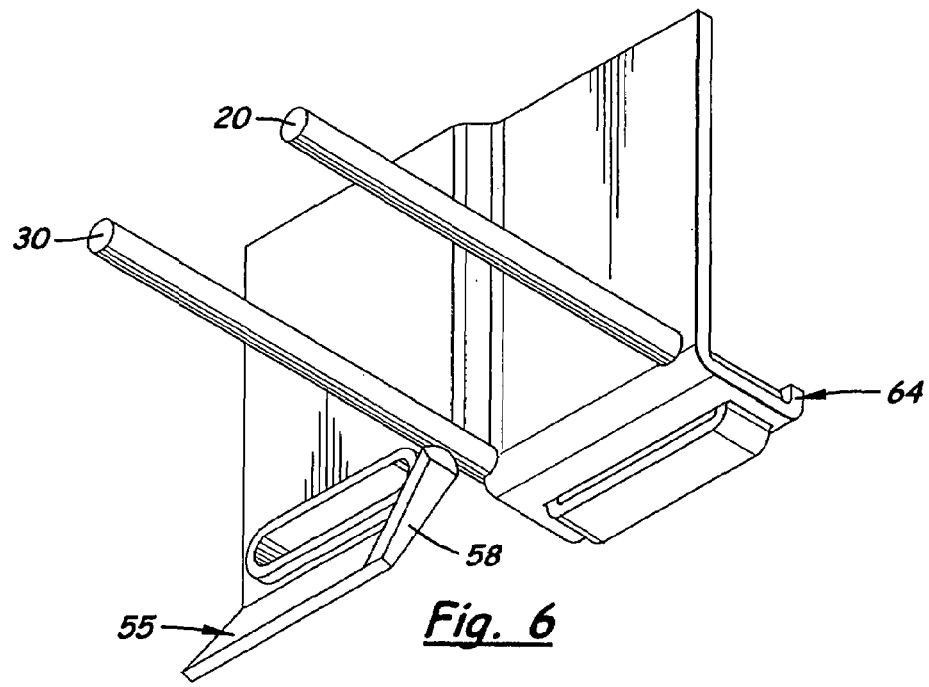
FIG. 6 is a bottom perspective view of the side plate shown in FIG. 5 with the two transverse rods disposed over the top surface of the foot.
Figure 7:
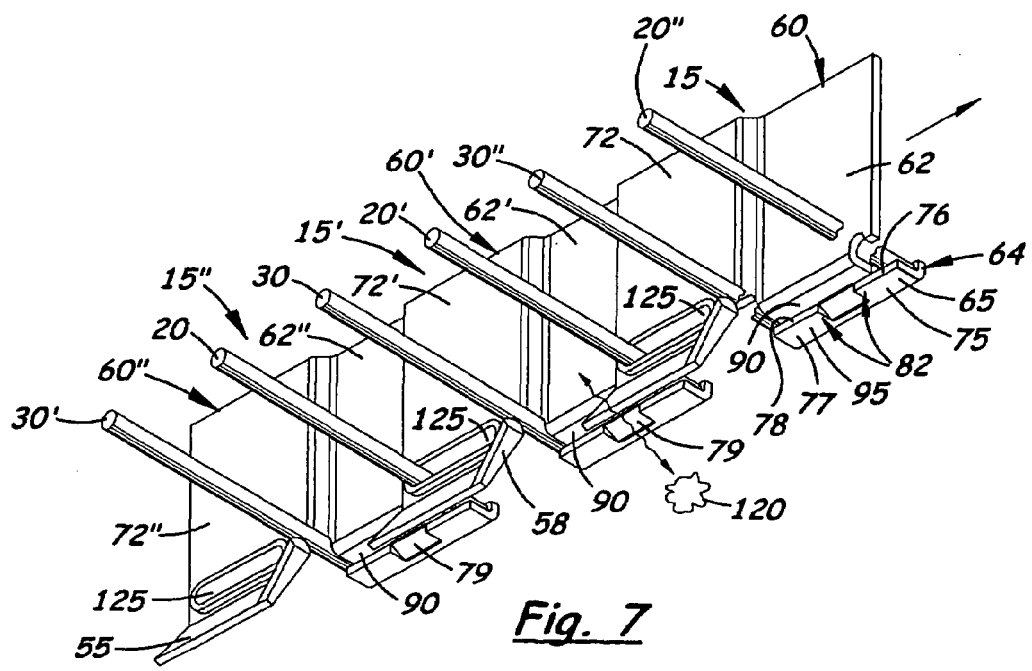
FIG. 7 is a bottom perspective view showing the side plates of three links interconnected with the mesh removed.

FIG. 7 is a bottom perspective view showing three, longitudinally aligned side plates 60, 60', and 60" on three adjacent links 15, 15', 15", respectively, with the support structure removed for greater clarity. It should be understood that the structural features on side plates 60, 60', and 60" shown in FIG. 4 are also found on the opposite side plates 40, 40', 40" (see FIG. 4). The transverse rods 20, 30 are welded to the inside surface of the outer one-half plate section 62 and to the top surface 66 of the foot 64 in the manner described in U.S. Pat. No. 6,796,420, which is incorporated herein, (see FIG. 6). The inner one-half plate section 72 is slightly offset inwardly with respect to the outer one-half plate section 62 thereby enabling the outer one-half plate section 62' on an adjacent link 15' to extend over the outer surface of the inner one-half plate section 72 on the adjacent link 15. During assembly, the inner one-half plate section 72 on one link 15 and the outer one-half plate section 62' on the adjacent link 15' overlap thereby enabling the adjacent side plates 60, 60' to slide together as the belt 10 moves from a straight or helical path 11, 12, respectively.

In the improved conveyor belt described herein, at least one step structure 70 is formed on the bottom surface 65 of the foot 64 that creates a downward extending, transversely aligned abutment edge 73 on the bottom surface 65 that divides the bottom surface 65 into an inner resting surface 80 and an outer drive support surface 85. The longitudinal axis 74 of the abutment edge 73 is parallel with the belts direction of travel and slightly offset with the inside surface of the sidewall 63.

The single step structure 70 is integrally formed on the bottom surface 65 of the foot 64. In FIGS. 7-10, the single step structure 70 is replaced by two narrow step structures 75, 77 also integrally formed on the bottom surface 65. The two step structures 75, 77 are spaced apart with their two vertical surfaces 76, 78, respectively, serving as an abutment edge 82 transversely aligned on the bottom surface 65. The vertical surfaces 76, 78 are transversely aligned on the foot 64 thereby dividing the bottom surface 65 into a resting surface 90 and a drive support surface 95. The two-step structures 75, 77 are separated by a sloped intermediate section 79 that extends diagonally from the resting surface 90 to the drive support surface 95. The intermediate section 79 serves as an additional structural connection between the resting surface 90 and the drive support surface 95. It should be appreciated that by integrally forming a single step structure 70 or a two step structures 75, 77 on each foot 64, a less expensive manufacturing method may be employed. It should be understood that the term 'integrally formed' means that the single step structure 70 and the two step structures 75, 77 are created by molding, casting or stamping manufacturing process.

In conveyor belts used in the prior art, the upper edges 17 of the lower side plates rest directly against the bottom surfaces of the transverse rods 20, 30 when the conveyor belt 10 is in a stacked configuration as shown in FIG. 2. Eventually, the transverse rods 20, 30 wear and fail.

Figure 5:
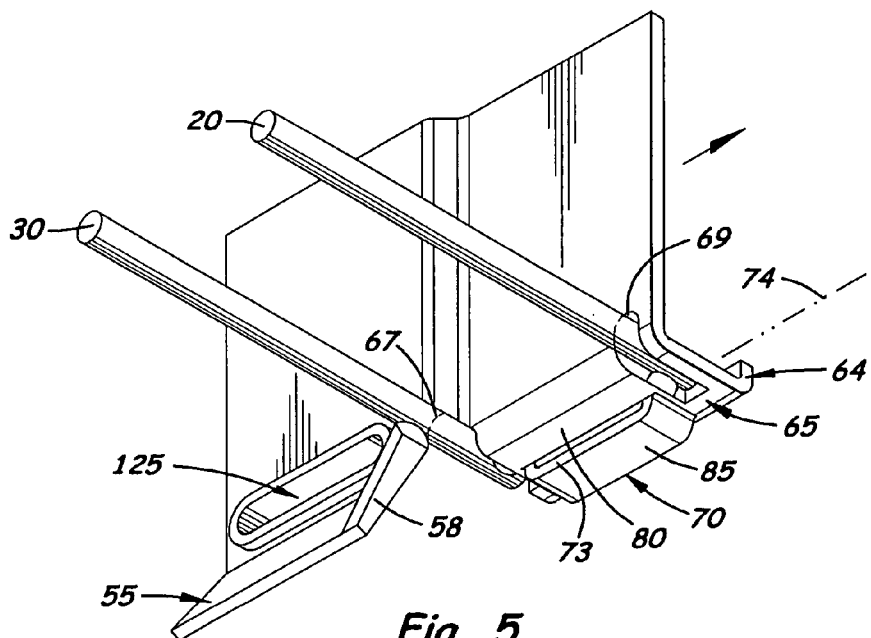
FIG. 5 is a bottom perspective view of a side plate with one large step structure formed on the bottom surface of the foot with the two transverse rods co-planar with the bottom surface of the foot.

To overcome wear on the transverse rods 20, 30, on the conveyor belt disclosed herein, the transverse rods 20 and 30 are made co-planar with the resting surface 80 or 90 on each foot 64 or slightly elevated on the foot 64 so that the wear occurs exclusively on the resting surface 80 or 90. FIGS. 5-11 show the two transverse rods 20, 30 extended through the side plates and attached to the top surfaces 66 of the two feet 64. In FIGS. 5, 7, and 9 two upward curved cutouts 67, 69 are formed near the lower edge of the outer one-half plate section 62. The cutouts 67, 69 are sufficiently deep so that the bottom surface of transverse rods 20, 30 are co-planar with the resting surface 80 or 90 formed on the foot 64. FIGS. 6 and 11 show the transverse rods 20 and 30 slightly elevated above the resting surface 80.

Figure 12:
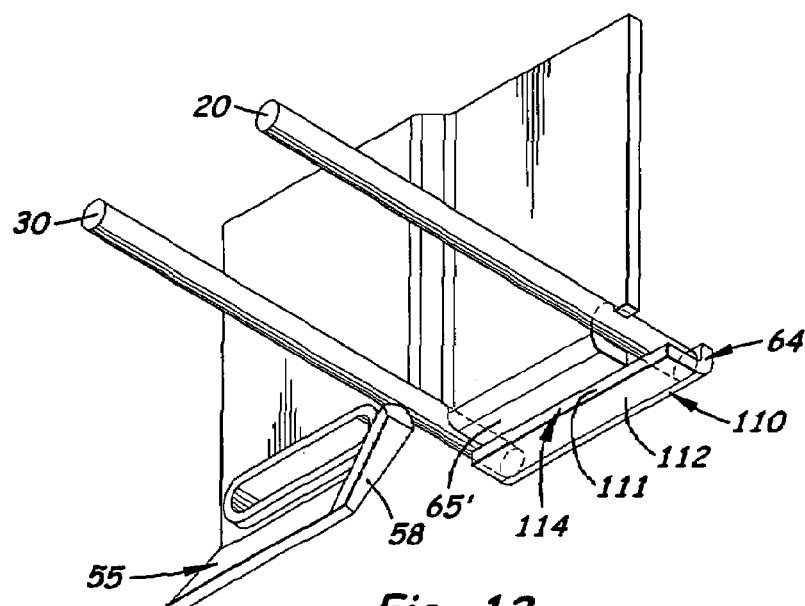
FIG. 12 is a perspective view of a third embodiment of a side plate with an L-shaped structure attached to the bottom surface of the foot.

In a third embodiment, shown in FIG. 12, the side plate is modified so that the foot, denoted 64', is smaller in width. Attached to the bottom surfaces of the sections of the two transverse rods 20, 30 that extend outward from the outer edge of the foot 64' is a rectangular shaped footplate 110. The footplate 110 is an L-shaped structure with a vertical inside surface 111 that acts as a transversely aligned, downward extending abutment edge 114 immediately adjacent to the outer edge of the foot 64'. The bottom surface of the foot 64' acts as a resting surface 114 while the bottom surface 112 of the footplate 110 acts as the drive support surface. In the preferred embodiment, the footplate 110 is welded onto the bottom surfaces of the two transverse rods 20, 30. Like the integral formed step structure embodiments described above, the transverse rods 20, 30 may be extended through inverted U-shaped cutouts (shown in FIG. 10) or holes formed on the side plates that enable the rods 20, 30 to be coplanar with the resting surface 65' or disposed over the top surface of the foot plate 110.

In all three embodiments, an abutment edge 73, 82 or 114 is formed that is slightly offset with the inside surface of the side plate thereby forming a resting surface 80, 90 or 65'. When the belt 10 is stacked, the upper edge of a side plate located on a lower link contacts the resting surface 80, 90, or 65'. The abutment edges 73, 82, 114 limit relative lateral movement between the upper tier and the lower tier.

Another important benefit of creating a resting surface 80, 90 or 65' is that when the belt is in a stacked configuration, the upper edge of the lower tier fits closely against the lower surface of the upper tier. During food process, cool or hot air denoted 120 is (see FIG. 7) impeded from traveling through the side plates and forced to travel through the support structure and around the product when the belt is aligned in a stacked position.

Like the side plates found in the prior art, an inward directed diagonal guide tab 55 is formed on the inner one-half plate section 72. In the improved side plate (40 and or 60) disclosed herein, a diagonally aligned beveled v-shaped surface 58 is welded or formed on the outer one-half plate section 72 and welded to transverse rod 30. During operation, the v-shaped surface 58 stiffens the diagonal guide tab 55 greatly reducing the likelihood of being displaced laterally or longitudinally which prevents the upper edge of the lower like from moving inward and prevents or limits stretching of the outer one-half plate section 72 along the direction of the belt.

As stated above, formed on the inner one-half plate section 72 is an elongated slot 125. During assembly, the transverse rod 20 on an adjacent link 15 extends through the elongated slot 125 to loosely connect the two adjacent links 15, 15' together. In the preferred embodiment, the two side plates 40, 60 both include an elongated slot 125 equal in size thereby enabling the belt 10 to turn in both directions.

Figure 13:
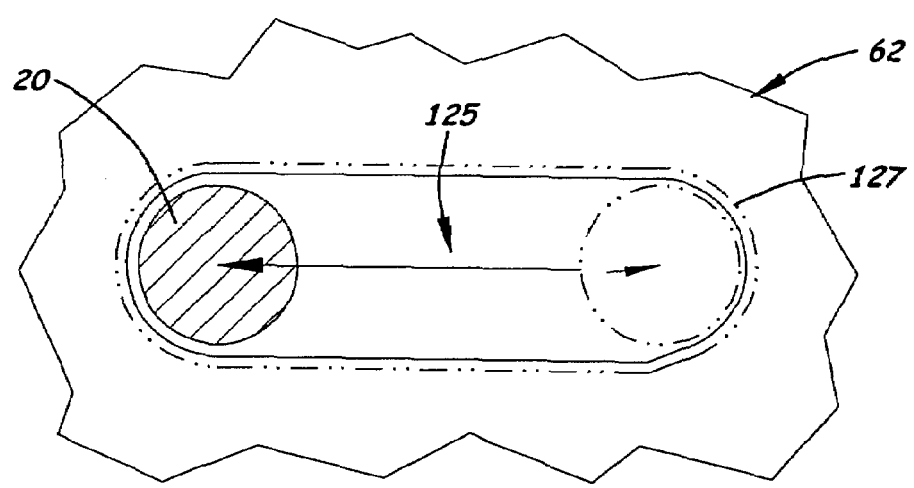
FIG. 13 is a partial side elevational view of the side plate showing the elongated slot with a smaller arc that approximately matches the diameter of the transverse rod.

In addition to using two elongated slots 125 on both side plates 40, 60 with each link, one or both elongated slots 125 may include a small diameter edge arc 127 as shown in FIG. 13. The small diameter edge arc 127 is approximately equal to the diameter of the transverse rod 20 thereby increasing the contact area between transverse rod 20 and the inside edge of the elongated slot 125. By increasing the contact areas between the transverse rod 20 and the elongated slot 125, the tensile forces in the belt 10 are distributed over larger areas, which reduces the wear rate of the contacting surfaces on the transverse rod 20 and on the arc 127.

In summary, the above improvements are designed to overcome several well known, yet unsolved problems, in the self-stacking conveyor belt industry. Because stresses on a conveyor belt 10 can be caused by several different components or a by a combination of components, several embodiments are described herein which use some or all of the improved features.

The cost to manufacture conveyor belts with abutment edges welded onto the feet is relatively expensive. To reduce costs, the single 70 or two step structures 75, 77 are integrally formed on the foot 64 using a machine stamping process. The machine stamping process is simple and relatively inexpensive, thereby reducing the overall manufacturing cost of manufacturing of the conveyor belt 10.

Thus, a method of manufacturing a self-stacking conveyor belt 10, is provided comprising of the following steps:

a. forming a plurality of transversely aligned interconnected links 15, 15'. Each link 15, 15' includes two transverse rods 20, 30, 20', 30' and two vertically aligned, opposite side plates 40, 60 and 40', 60', each said side plate including a laterally extending foot with at least one integrally formed step structure formed thereon that forces a transversely aligned abutment edge and divides said bottom surface into a resting surface and a drive support surface;

b. disposing a flexible mesh structure 46 made of a plurality of small plastic or metal structures 48 that individually wrap around adjacent transverse rods 20, 30 and 20', 30' are disposed between the side plates 40, 60, and 40', 60' and are used to support products on the conveyor belt 10; and, c. connecting the end links on said belt together to form an endless conveyor belt 10.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An improved, self-stacking conveyor belt with a plurality of interconnected links used to support a flexible support structure, each said link including two side plates and two parallel transverse rods extending there between, each said side plate includes an outer one-half plate section and an offset inner one-half plate section, a lateral foot attached to each said outer one-half plate section, and an inward directed, downward extending guide tab attached or formed on said inner one-half plate section, each said inner one-half plate section including a longitudinally aligned slot capable of receiving a transverse rod attached to an adjacent link to couple two adjacent, parallel links together, said improvement including at least one downward extending, abutment edge formed on each said foot, said abutment edge being offset with the inside surface of said outer one-half plate section thereby forming a resting surface to support an upper link in a stacked configuration over a lower link, said abutment edge acting as a stop surface that prevents lateral movement of said upper link over a lower link when said belt is stacked in a stacked configuration, said abutment edge being formed by two-step structures spaced apart and separated by a diagonal intermediate section formed on the bottom surface of said foot.

2. The improved, self-stacking conveyor belt, as recited in claim 1, further including a transversely aligned beveled surface formed on said guide tab.

3. The improved, self-stacking conveyor belt, as recited in claim 1, wherein said transverse rods are co-planar with said resting surface.

4. The improved, self-stacking conveyor belt, as recited in claim 1, wherein at least one said elongated slot includes an edge are substantially equal in diameter to said transverse rod, thereby increasing the area of contact between a transverse rod inserted into said elongated slot.

5. An improved, self-stacking conveyor belt with a plurality of interconnected links used to support a flexible support structure, each said link including two side plates and two parallel transverse rods extending there between, each said side plate includes an outer one-half plate section and an offset inner one-half plate section, a lateral foot attached to each said outer one-half plate section, and an inward directed, downward extending guide tab attached or formed on said inner one-half plate section, each said inner one-half plate section including a longitudinally aligned slot capable of receiving a transverse rod attached to an adjacent link to couple two adjacent, parallel links together, said improvement including at least one downward extending, abutment edge formed on each said foot, said abutment edge being offset with the inside surface of said outer one-half plate section thereby forming a resting surface to support an upper link in a stacked configuration over a lower link, said abutment edge acting as a stop surface that prevents lateral movement of said upper link over a lower link when said belt is stacked in a stacked configuration, said abutment edge is formed by a single step structure integrally formed on said foot and the bottom surfaces of said transverse rods are co-planar with said resting surface.

6. An improved, self-stacking conveyor belt with a plurality of interconnected links used to support a flexible support structure, each said link including two side plates and two parallel transverse rods extending there between, each said side plate includes an outer one-half plate section and an offset inner one-half plate section, a lateral foot attached to each said outer one-half plate section, and an inward directed, downward extending guide tab attached or formed on said inner one-half plate section, each said inner one-half plate section including a longitudinally aligned slot capable of receiving a transverse rod attached to an adjacent link to couple two adjacent, parallel links together, said improvement including at least one downward extending, abutment edge formed on each said foot, said abutment edge being offset with the inside surface of said outer one-half plate section thereby forming a resting surface to support an upper link in a stacked configuration over a lower link, said abutment edge acting as a stop surface that prevents lateral movement of said upper link over a lower link when said belt is stacked in a stacked configuration, said abutment edge is formed by a footplate attached to said side plate wherein the bottom surface of said transverse rods are co-plannar with said resting surface.

7. An improved, self-stacking conveyor belt, with a plurality of interconnected links used to support a flexible support structure, each said link including two side plates and two parallel transverse rods extending there between, each said side plate includes an outer one-half plate section and an offset inner one-half plate section, a lateral foot attached to each said outer one-half plate section, and an inward directed, downward extending guide tab attached or formed on said inner one-half plate section, each said inner one-half plate section including a longitudinally aligned slot capable of receiving a transverse rod attached to an adjacent link to couple two adjacent, parallel links together, said improvement including at least one downward extending, abutment edge formed on each said foot, said abutment edge being offset with the inside surface of said outer one-half plate section thereby forming a resting surface to support an upper link in a stacked configuration over a lower link, said abutment edge acting as a stop surface that prevents lateral movement of said upper link over a lower link when said belt is stacked in a stacked configuration and a transversely aligned beveled surface formed on said guide tab.

8. An improved, self-stacking conveyor belt with a plurality of interconnected links used to support a flexible support structure, each said link including two side plates and two parallel transverse rods extending there between, each said side plate includes an outer one-half plate section and an offset inner one-half plate section, a lateral foot attached to each said outer one-half plate section, and an inward directed, downward extending guide tab attached or formed on said inner one-half plate section, each said inner one-half plate section including a longitudinally aligned slot capable of receiving a transverse rod attached to an adjacent link to couple two adjacent, parallel links together, said improvement including at least one downward extending, abutment edge formed on each said foot, said abutment edge being offset with the inside surface of said outer one-half plate section thereby forming a resting surface to support an upper link in a stacked configuration over a lower link, said abutment edge acting as a stop surface that prevents lateral movement of said upper link over a lower link when said belt is stacked in a stacked configuration, said transverse rods extending through said side plates on said links and the bottom surface of transverse rods are co-planar with said resting surface.

9. An improved, self-stacking conveyor belt with a plurality of interconnected links used to support a flexible support structure, each said link including two side plates and two parallel rods extending there between, each said side plate including an outer one-half plate section and an offset inner one-half plate section, a lateral foot attached to each said outer one-half plate section, and a guide tab attached or formed on said inner one-half plate section used to stack said links when disposed in a spiral configuration, each said inner one-half plate section including a transversely aligned elongated slot capable of receiving the outer said transverse rod attached to an adjacent link to couple two adjacent, parallel links together, said improvement including a transversely aligned beveled surface formed on said guide tab, said beveled surface including an upper edge securely attached to the inner said transverse rod.

10. The improved, self-stacking conveyor belt, as recited in claim 9, wherein at least one said elongated slot includes an edge are substantially equal in diameter to said transverse rod, thereby increasing the area of contact between said rod and said slot.

* * * * *